(12) United States Patent
Weiker

(10) Patent No.: US 10,846,784 B2
(45) Date of Patent: Nov. 24, 2020

(54) SYSTEM FOR PART ASSEMBLY VERIFICATION AND SHIPPING CONTAINER LABELLING

(71) Applicant: Sonoco Development, Inc., Hartsville, SC (US)

(72) Inventor: John Weiker, Clyde, OH (US)

(73) Assignee: Sonoco Development, Inc., Hartsville, SC (US)

( * ) Notice: Subject to any disclaimer, the term of this patent is extended or adjusted under 35 U.S.C. 154(b) by 979 days.

(21) Appl. No.: 15/219,564

(22) Filed: Jul. 26, 2016

(65) Prior Publication Data

US 2017/0032453 A1    Feb. 2, 2017

Related U.S. Application Data

(60) Provisional application No. 62/198,334, filed on Jul. 29, 2015.

(51) Int. Cl.
*G06Q 30/00* (2012.01)
*G06Q 30/06* (2012.01)
*G06Q 10/08* (2012.01)
*G06F 16/951* (2019.01)

(52) U.S. Cl.
CPC ....... *G06Q 30/0637* (2013.01); *G06F 16/951* (2019.01); *G06Q 10/083* (2013.01); *G06Q 10/0875* (2013.01)

(58) Field of Classification Search
CPC .......... G06Q 30/0637; G06Q 10/0875; G06Q 30/0641

USPC .............. 705/26.82, 27.1; 700/107
See application file for complete search history.

(56) References Cited

U.S. PATENT DOCUMENTS

| | | | |
|---|---|---|---|
| 5,568,715 A * | 10/1996 | Ebel | B07C 5/3404 53/494 |
| 5,923,014 A | 7/1999 | Syzmusiak | |
| 7,218,982 B1 | 5/2007 | Koenig | |
| 8,064,082 B2 | 11/2011 | Bunsey et al. | |
| 8,086,337 B1 | 12/2011 | Green | |
| 2006/0043174 A1 | 3/2006 | Banavar et al. | |
| 2013/0144431 A1 | 6/2013 | Tidhar et al. | |
| 2013/0317642 A1 * | 11/2013 | Asaria | G06Q 10/08 700/216 |
| 2014/0360141 A1 * | 12/2014 | Willard, III | G06Q 30/0635 53/507 |

OTHER PUBLICATIONS

Anonymous, Product Showcase, Oct. 2004, Rogers Media Inc., 57(10), 42. (Year: 2004).*
SPEDE Technologies; "Real-time Inventory Control and Internal Traceability System"; webpage; 2013; http://www.spede.com/documents/SPEDE%20Plant%20Diagram.pdf.

* cited by examiner

*Primary Examiner* — Brittney N Miller
(74) *Attorney, Agent, or Firm* — Miller, Matthias & Hull LLP

(57) ABSTRACT

A system and method is provided for enabling a parts supplier to verify that a customer's part or part assembly requirements are satisfied and for creating a label for a shipping container in which the parts or part assemblies are shipped to the customer. The system also verifies that the label matches the parts and/or part assemblies that have been loaded into the shipping container.

3 Claims, 6 Drawing Sheets

Daily Production Schedule Plan

Operation: _____   Date: _____

Locaton: _____   Shift: _____

Employee Name: _____   Employee Number: _____

| Part No. | Part Name | Customer | Daily require'ts | Parts per container | No. of containers | Label type/color |
|---|---|---|---|---|---|---|
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |

SYSTEM FOR PART ASSEMBLY VERIFICATION AND SHIPPING CONTAINER LABELLING

BACKGROUND OF THE INVENTION

Field of the Invention

This disclosure relates to a system for verifying that a customer's part or part assembly requirements are satisfied and for creating a label for a shipping container in which parts or assemblies are shipped to the customer. The system also is capable of verifying that the label matches the parts and/or assemblies that have been loaded into the shipping container.

Description of the Related Art

Automobile and other manufacturers require a parts supply system in which parts and part assemblies are consistently and accurately shipped to the manufacturing facility. Errors in parts supply can temporarily shut down entire assembly lines resulting in significant costs.

For example, a part assembly such as a tire changing kit might comprise a jack, a lug wrench and other parts, all embedded in a foam carrier which is then installed in a vehicle's trunk. The automobile manufacturer requires that the tire changing kits are complete and accurate when delivered to the automobile assembly facility. A wrong tire changing kit can slow down production or require replacement.

Shipping container miscounts, either low counts or high counts, can be serious problems in the automotive industry. If there is a high count by one, resulting in an extra part in a shipping container, the manufacturer may think that a part was not put into a vehicle. The manufacturer may decide that they must go back through the assembled fleet until either they find a vehicle with that missing part or verify that all parts are present and installed and that the part over the correct count was an extra part.

It is known to use bar code technology to identify parts on an assembly line. For example, U.S. Patent Application Publication No. 2013/0144416 teaches using a barcode scanner operatively coupled to a computer for identifying materials, components and other products used during an assembly operation. But bar codes can be incorrectly applied to a part, and thus cannot ensure the identity of a part or assembly. Also, bar codes alone cannot ensure that parts and part assemblies are consistently and accurately packaged shipped.

The present disclosure addresses these needs.

BRIEF SUMMARY OF THE INVENTION

The present disclosure relates to a system and method for enabling a parts supplier to verify that a customer's part or part assembly requirements are satisfied and for creating a label for a shipping container in which the parts or part assemblies are shipped to the customer. The system verifies that each part assembly is complete, and that each shipping container holds the correct number of parts or part assemblies ("the count"). The system also verifies that the label placed on each shipping container matches the parts and/or part assemblies that have been loaded into the shipping container.

The system enables the user to interface with production equipment for real-time downloading and tracking of production parameters that can be selectively chosen for traceability, and to conduct real-time tracking of selected quality checks and controls. The system may allow the user to replace most or all production and quality documents with that are normally handwritten for later manual inputting into the system, with instantaneous and automatic input into the system for real-time information and control.

DETAILED DESCRIPTION OF THE INVENTION

Figure 1:
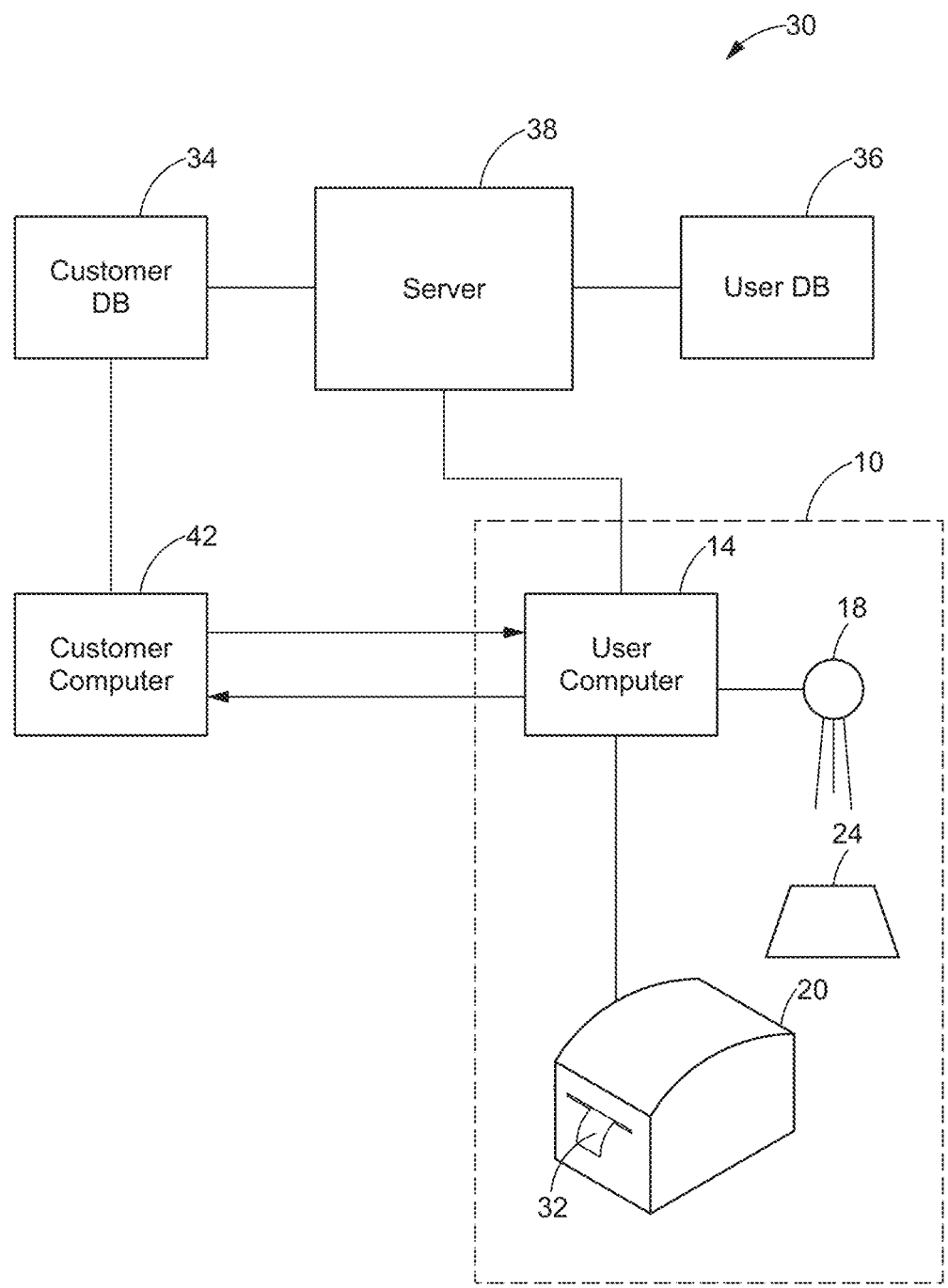
FIG. 1 is a schematic diagram of a part assembly verification system according to the disclosure.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

This disclosure relates to a system 30 and method for verifying that a customer's part or part assembly requirements are satisfied and for creating a label 32 for a shipping container 28 in which the parts or part assemblies 24 are shipped to the customer. The system 30 verifies that each part assembly 24 is complete and that each shipping container 28 holds the correct number of parts or part assemblies 24 ("the count"). The system also verifies that the label 32 placed on the shipping container 28 matches the parts and/or part assemblies 24 that have been loaded into the shipping container 28.

FIG. 1 is a schematic diagram of a part assembly verification system 30. The system 30 may comprise the following components: a customer (e.g., an automobile manufacturer) database 34 for storing the customer's part or assembly requirements;

a user (e.g., an automobile part manufacturer) database 36 for storing a customer's part and assembly information, including the components required for the assembly 24;

a server computer 38 in communication with the customer database 34 and the user database 36;

a scanning station 10 comprising a user computer 14 in communication with the server computer 38 and one or more infrared (IR) vision sensors and/or laser sensors 18 for identifying a part or assembly 24 to be loaded into a container 28 and to verify that the part or assembly 24 is correct;

a touchscreen 16 in communication with the user computer 14 for receiving touchscreen input from an operator, the touchscreen input including the operator's identity;

a software program run locally on the user computer 14 (or remotely on, for example, the server computer 38) for verifying that the customer's part or assembly requirements are satisfied and for creating the shipping container label 32;

a printer 20 for printing a shipping container label 32 in response to instructions received from the user computer 14; and a customer computer 42 for sending work instructions (WI) to the user via the user computer 14.

Figure 2:
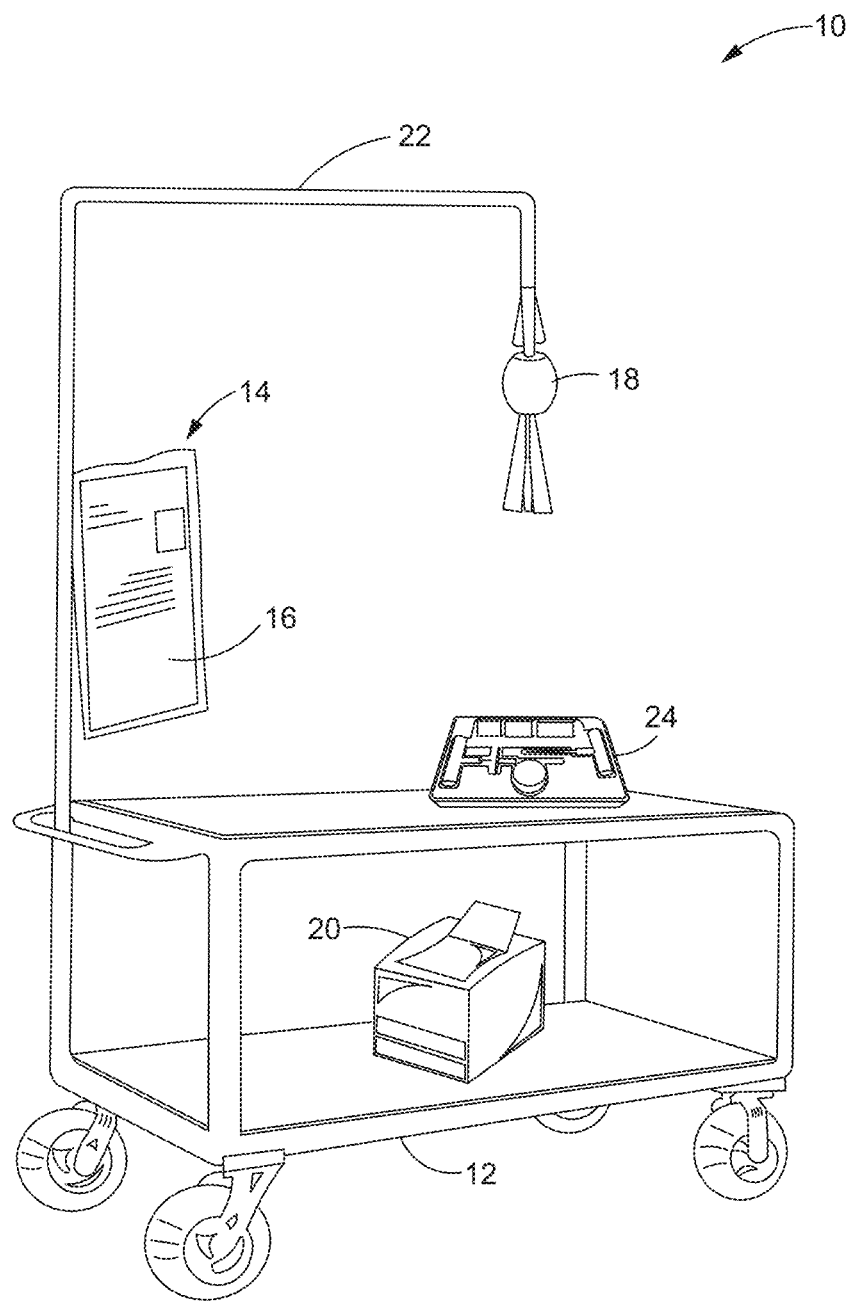
FIG. 2 is perspective view of a scanning station of the type that may be used in the present system.

FIG. 2 is perspective view of a scanning station 10 of the type that may be used in the present system 30. The scanning station 10 may comprise a moveable instrument cart 12 carrying various system components, such as the user computer 14 and touchscreen monitor 16, the one or more sensors 18, such as infrared (IR) vision sensors and/or laser sensors, and the label printer 20. The sensors 18 may be mounted to a moveable and retractable arm 22 extending above the cart 12 and configured to extend over a conveyor line 40 for carrying parts or part assemblies 24.

Figure 3:
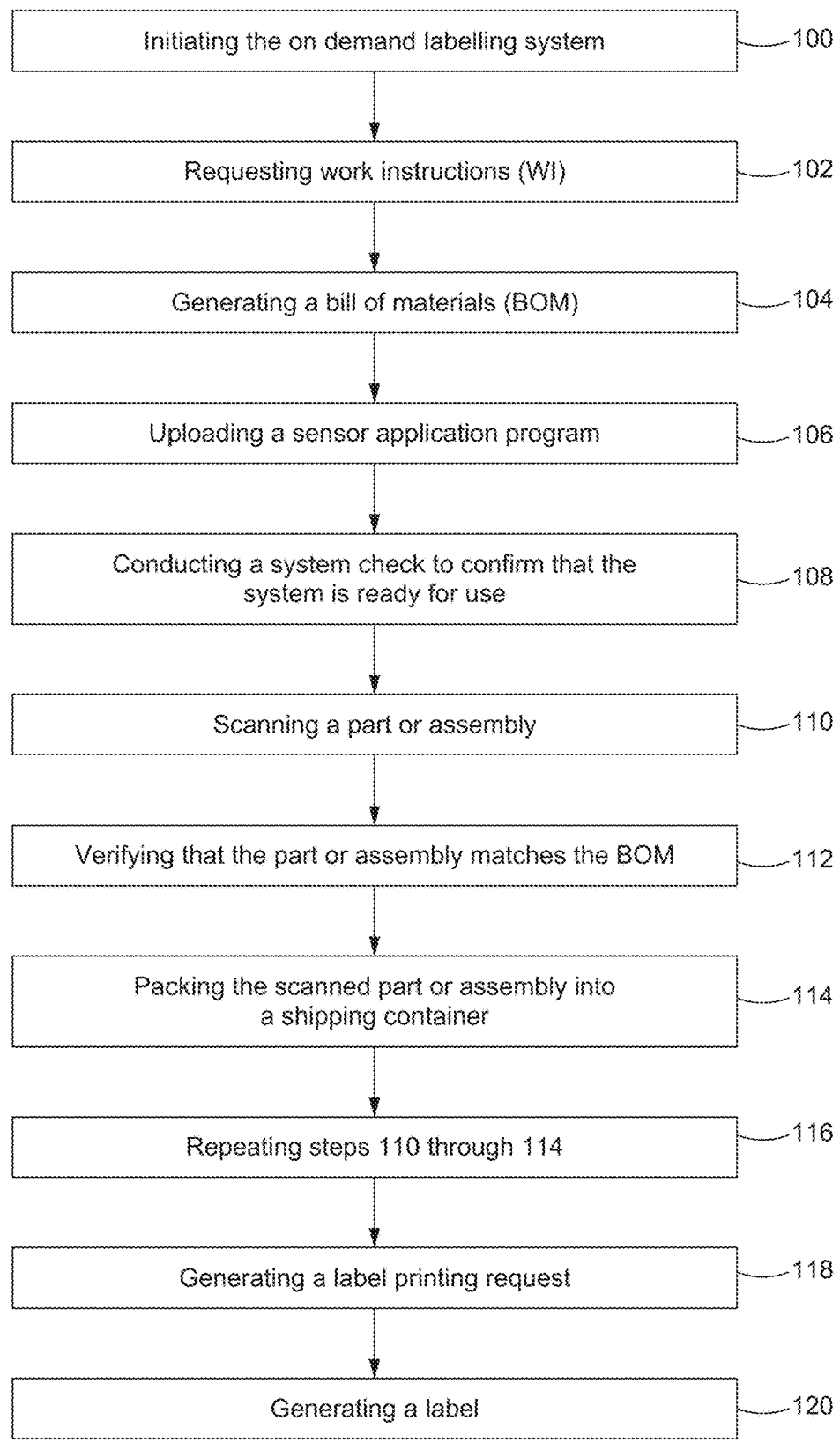
FIG. 3 is a flow diagram of a part assembly verification method according to the disclosure.

FIG. 3 is a flow diagram showing a sample sequence of steps for verifying that a customer's part or assembly requirements are satisfied and for creating a label 32 for a shipping container 28 in which parts or assemblies 24 are shipped to the customer. The flow diagram in FIG. 3 is shown and described for example purposes only to assist in disclosing the steps of the method. More or fewer steps in a same or different order than those shown may be included in the method without departing from the scope of the present disclosure. The system 30 verifies that each part assembly 24 is complete and that each shipping container 28 holds the correct number of parts or part assemblies 24 ("the count"). The system 30 also is capable of verifying that the label 32 matches the parts and/or assemblies 24 that have been loaded into the shipping container 28. The method may comprise the following steps:

Step 100: Logging in: Initiating the "on demand" labelling system 30 by using a touchscreen 16 to input to a user computer 14 an operator code. After logging in, the system 30 records the operator's actions and ties them back to the operator's identity as long as the operator is logged in. Logging in may be accomplished in other ways, for example by swiping an operator's ID or employee card.

Step 102: Requesting work instructions (WI) from a customer computer 42 by using the touchscreen 16. The work instructions are viewable on the touchscreen 16, and may include quality assurance (QA) information, the identity and number of parts or assemblies 24 ("count") to be packaged in a container 28, the part or assembly number and other information regarding the packing job that the operator will be doing during that work session.

Step 104: Generating on the touch screen 16 a bill of materials (BOM) 44. The BOM 44 may include the identity of each part and the number of parts required for each assembly. The BOM may also include the number of parts or part assemblies ordered ("the count").

Step 106: Uploading a sensor application program (SAP) from the user computer 14, the server computer 38 or another computer. The sensor 18 may be a visual sensor such as an IR sensor, a laser sensor or any sensor suitable for identifying a part 24.

Step 108: Conducting a system check to confirm that the system 30 is ready for use. The system check may include a visual (physical) scan of the parts 24 to be packed and of the shipping container 28 to verify that the parts 24 and the shipping container 28 are correct. If all checks are satisfied, then the user computer 14 will put the system 30 into a "Run" mode and will generate a display on the touchscreen 16 that the system is ready for use. The operator can then begin the part verification process set forth in steps 110 through 114.

Step 110: Scanning a part or part assembly 24 using a visual sensor 18 and transmitting the scanned information to the user computer 14.

Step 112: Verifying (by the user computer 14) that the part or part assembly 24 matches the BOM 44, counting the part or assembly 24, and transmitting the part or assembly data to a server 38.

Step 114: Packing the scanned part or assembly 24 into the shipping container 28.

Step 116: Repeating steps 110 through 114 until the full container count is met and verified.

Step 118: Generating a label printing request and transmitting that request to a printer 20.

Step 120: Generating a label 32 and applying it to the shipping container 28.

In a key aspect, the system 30 provides for two-way communication between the supplier (user) and the customer. The customer may communicate to the supplier the customer's part or assembly requirements by allowing the supplier access to a customer database 34 on which is stored the customer's part or assembly requirements. The supplier may request work instructions from the customer (or customer computer 42) by using the touchscreen 16. The work instructions may include the identity and number of parts or assemblies 24 requested by the customer.

Figure 4:
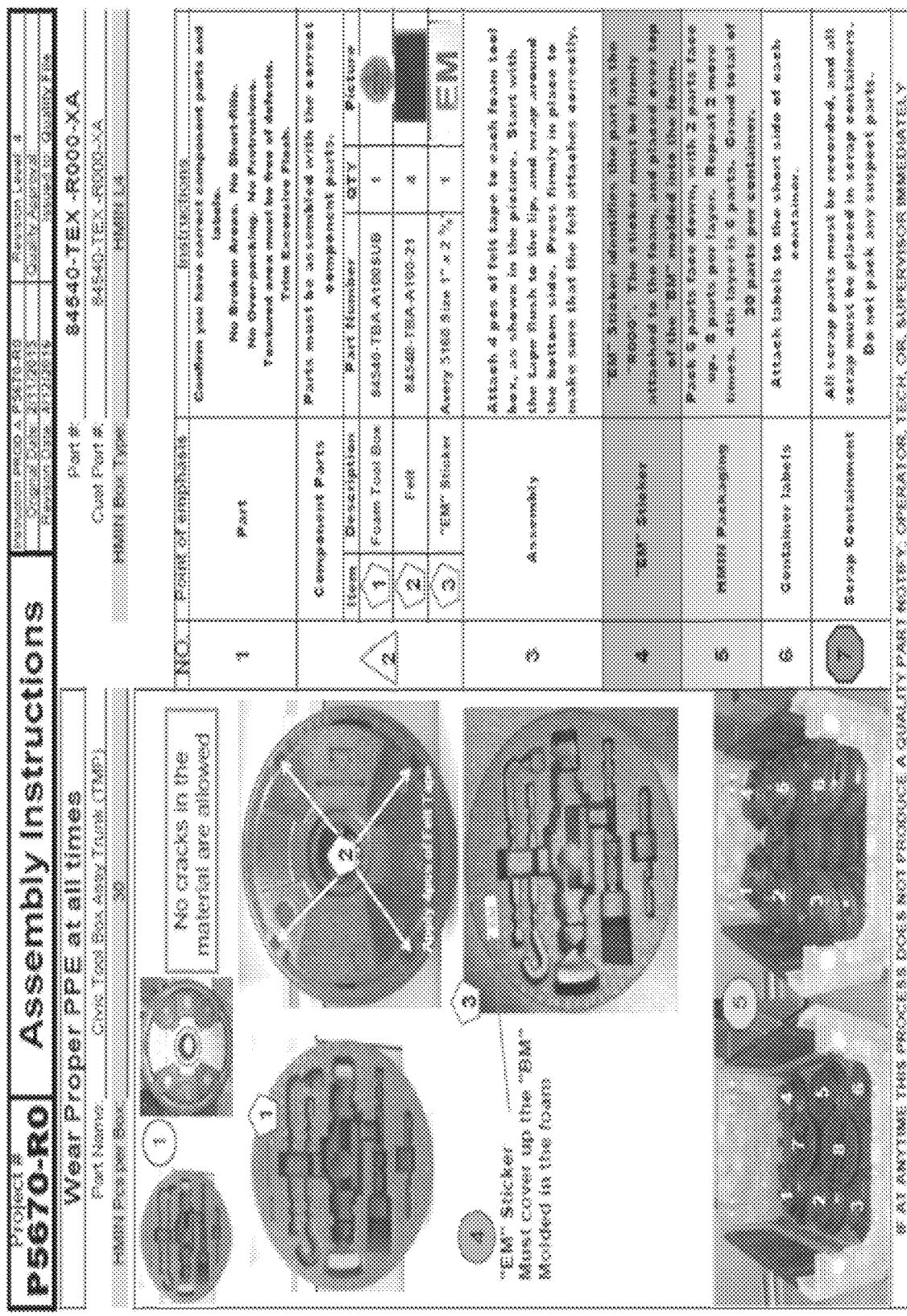
FIG. 4 is a diagram illustrating an exemplary user interface.

FIG. 4 is a diagram illustrating an exemplary user interface as it might appear on the user's touchscreen 16. In this example, the user interface displays Assembly Instructions, a.k.a. Work Instructions (WI), including a list of written instructions on the right hand side of the interface supported by visual images on the left hand side of the interface. The instructions include a listing of the parts, part numbers and the quantity of each required by the customer.

Figure 5:
FIG. 5 is a diagram illustrating a Daily Production Schedule Plan for a particular user and day, including an exemplary bill of materials.

FIG. 5 is a diagram illustrating an exemplary "Daily Production Schedule Plan" including a bill of materials for that particular user ("Employee") and day. In this example, the bill of materials includes a list of part numbers, part names, customer names, daily requirements for that customer, parts per container, number of containers and the label type and/or color.

Figure 6:
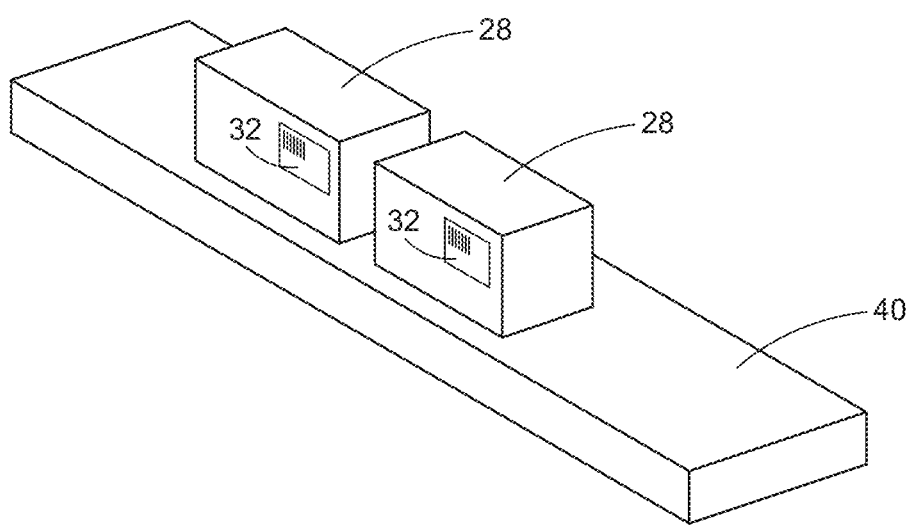
FIG. 6 is a perspective view of a conveyor system carrying one or more shipping containers.

FIG. 6 is a perspective view of a conveyor system 40 carrying one or more shipping containers 28. After the user has generated a label 32, the label may be adhered to or otherwise placed on a shipping container 28.

INDUSTRIAL APPLICABILITY

The system 30 can be used in a storehouse/shipping environment to verify that a customer's part or part assembly requirements are satisfied and to create a label 32 for a shipping container 28 in which the parts or part assemblies 24 are shipped to the customer. The system 30 also can verify that the label 32 matches the parts and/or part assemblies 24 that have been loaded into the shipping container 32.

The system 30 also can be used in a production/manufacturing environment to enter production/manufacturing data and product quality data in real time. For example and without limitation, the system 30 can be tied into process equipment such as a press or assembly machine (not shown) and data from the process equipment can be transmitted directly to the system's local computer 14.

The system 30 can also minimize or eliminate paper documents by tying the system 30 to a local server 38. Currently packers and manufacturing unit operators manually record what they've done during their shift. Someone may take that information and then manually enter it into a computer database 36 where it can be accessed. With the present system 30, the data can be automatically entered into a database 36.

The system 30 can also receive process parameters (pressures, temperatures, flow rates, product weight, dwell times, etc.) directly from the equipment for every part or assembly 24 made. The process allows for automatic retrieval of the process information and other information in paperless form.

The system 30 is particularly useful when used with manual processes that are not completely mechanized. The system 30 can verify that an assembly 24 is complete by visually scanning the assembly 24.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A system for verifying that a customer's part or assembly requirements are satisfied and for creating a label for a shipping container in which parts or assemblies are shipped to the customer, the system also capable of verifying that the label matches the parts and/or assemblies that have been loaded into the shipping container, the system comprising:

a customer database for storing the customer's part or assembly requirements, wherein the customer database is accessible to both the customer and a user;

a user database for storing part and assembly information, including components required for assembly;

a server computer in communication with the customer database and the user database;

a user computer in communication with the server computer;

a touchscreen monitor in communication with the user computer for receiving touchscreen input from an operator, the touchscreen input including the operator's identity;

one or more infrared (IR) vision sensors and/or laser sensors for identifying a part or assembly to be loaded into the shipping container and verifying that the part or assembly is correct;

a software program run locally or remotely for verifying that the customer's part or assembly requirements are satisfied and for creating the shipping container label; and a printer for printing the label in response to input received from the user computer.

2. The system of claim 1 wherein:

the user computer, touchscreen monitor, one or more infrared (IR) vision sensors and/or laser sensors, and printer are carried on a moveable instrument cart.

3. The system of claim 2 wherein:

the one or more infrared (IR) vision sensors and/or laser sensors are mountable to a moveable and retractable arm extending above the moveable instrument cart and configured to extend over a part or assembly moving along a conveyor line.

* * * * *